(12) United States Patent
Jan

(10) Patent No.: US 8,193,752 B2
(45) Date of Patent: Jun. 5, 2012

(54) ACTUATOR ASSEMBLY HAVING OPERATION INDICATION FUNCTION

(75) Inventor: Shie-Li Jan, Taichung (TW)

(73) Assignee: Hiwin Mikrosystem Corp., Nantun District, Taichung (TW)

( * ) Notice: Subject to any disclaimer, the term of this patent is extended or adjusted under 35 U.S.C. 154(b) by 318 days.

(21) Appl. No.: 12/658,244

(22) Filed: Feb. 4, 2010

(65) Prior Publication Data

US 2011/0187214 A1    Aug. 4, 2011

(51) Int. Cl.
*H02K 11/00*    (2006.01)
(52) U.S. Cl. ....................................... 318/558
(58) Field of Classification Search .................. 318/558
See application file for complete search history.

(56) References Cited

U.S. PATENT DOCUMENTS

| | | | | |
|---|---|---|---|---|
| 3,880,635 A * | 4/1975 | Jack et al. | ........................ | 65/106 |
| 5,432,496 A * | 7/1995 | Lin | ................................ | 340/468 |
| 5,716,425 A * | 2/1998 | Wolfe et al. | ...................... | 65/106 |
| 5,833,529 A * | 11/1998 | Jacob | ............................... | 454/61 |
| 5,931,039 A * | 8/1999 | Yoshimizu et al. | ............. | 72/217 |
| 6,990,914 B2 * | 1/2006 | Canan | ........................... | 112/119 |

* cited by examiner

*Primary Examiner* — Mark Budd
(74) *Attorney, Agent, or Firm* — Charles E. Baxley

(57) ABSTRACT

An actuator assembly having an operation indication function is disclosed. The actuator assembly includes an actuator, a controller and an indication lamp set. The actuator has a motor, a screw, and an extension rod, which has limit positions connected with a limit switch set. The controller controls the motor of the actuator to rotate clockwise or anticlockwise. The indication lamp set is settled on at least one point on a circuit between the actuator and the controller and electrically communicated with the limit switch set. Thereby, when the extension rod touches any of the limit positions and thus triggers the limit switch set, the indication lamp set illuminates to indicate that the extension rod of the actuator reaches the corresponding limit position.

6 Claims, 4 Drawing Sheets

ACTUATOR ASSEMBLY HAVING OPERATION INDICATION FUNCTION

BACKGROUND OF THE INVENTION

1. Technical Field

The present invention relates to actuators, and more particularly, to an actuator assembly wherein an actuator having limit switches is provided with operation indication lamps at the limit switches for indicating whether any of the limit switches of the actuator is triggered.

2. Description of Related Art

A conventional actuator typically has a limit switch. When an extension rod of the actuator touches the limit switch, the actuator stops moving for mechanical protection. However, an operator of the conventional actuator has no way to confirm whether the actuator has reached its limit but visual observation, yet the actuator is typically installed inside a system and not visually accessible. For instance, when the actuator is set on a brake device of a wind power generator, an operator being hindered from directly seeing the actuator located in the generator has no way to know the braking status and operational normalcy of the actuator but wait for stop of the blades of the wind power generator. This causes inconvenience in operation.

SUMMARY OF THE INVENTION

The defect of the conventional actuator may be summarized as lacking for an indication mechanism that indicates the contact between the extension rod and the limit switch, so that a user can only determine the contact by means of visual observation. However, in many applications, the actuator is hidden in a mechanical system and not easy to directly observe, such as inside a wind power generator. Consequently, the users have no way to directly recognize whether brake operation is completed. For remedying this problem, the present invention provides an actuator assembly having an operation indication function.

According to the present invention, an actuator assembly having an operation indication function includes: an actuator having a motor, a screw and an extension rod that has limit positions connected with a limit switch set; a controller controlling the motor of the actuator to rotate clockwise or anticlockwise; and an indication lamp set settled on at least one point on a circuit between the actuator and the controller and electrically communicated with the limit switch set, whereby when the extension rod touches any of the limit positions and thus triggers the limit switch set, the indication lamp set illuminates to indicate that the extension rod of the actuator reaches the corresponding limit position.

The primary objective of the present invention is to provide an actuator assembly having an operation indication function, wherein an indication lamp set visually indicates whether a limit switch set of the actuator is triggered, and whether the actuator works normally so as to ensure reliable and convenient operation.

Another objective of the present invention is to provide an actuator assembly having an operation indication function, wherein one or more indication lamp set may be provided at any location on a circuit between a controller and an actuator of the actuator assembly without needing any additional signal feedback circuit.

Still another objective of the present invention is to provide an actuator assembly having an operation indication function, wherein an indication lamp set is composed of a plurality of Zener diodes and resistors together with a first lamp and a second lamp, thus being simple in structure, easy to install and inexpensive.

BRIEF DESCRIPTION OF THE DRAWINGS

The invention as well as a preferred mode of use, further objectives and advantages thereof will be best understood by reference to the following detailed description of an illustrative embodiment when read in conjunction with the accompanying drawing, wherein.

DETAILED DESCRIPTION OF THE INVENTION

Figure 1:
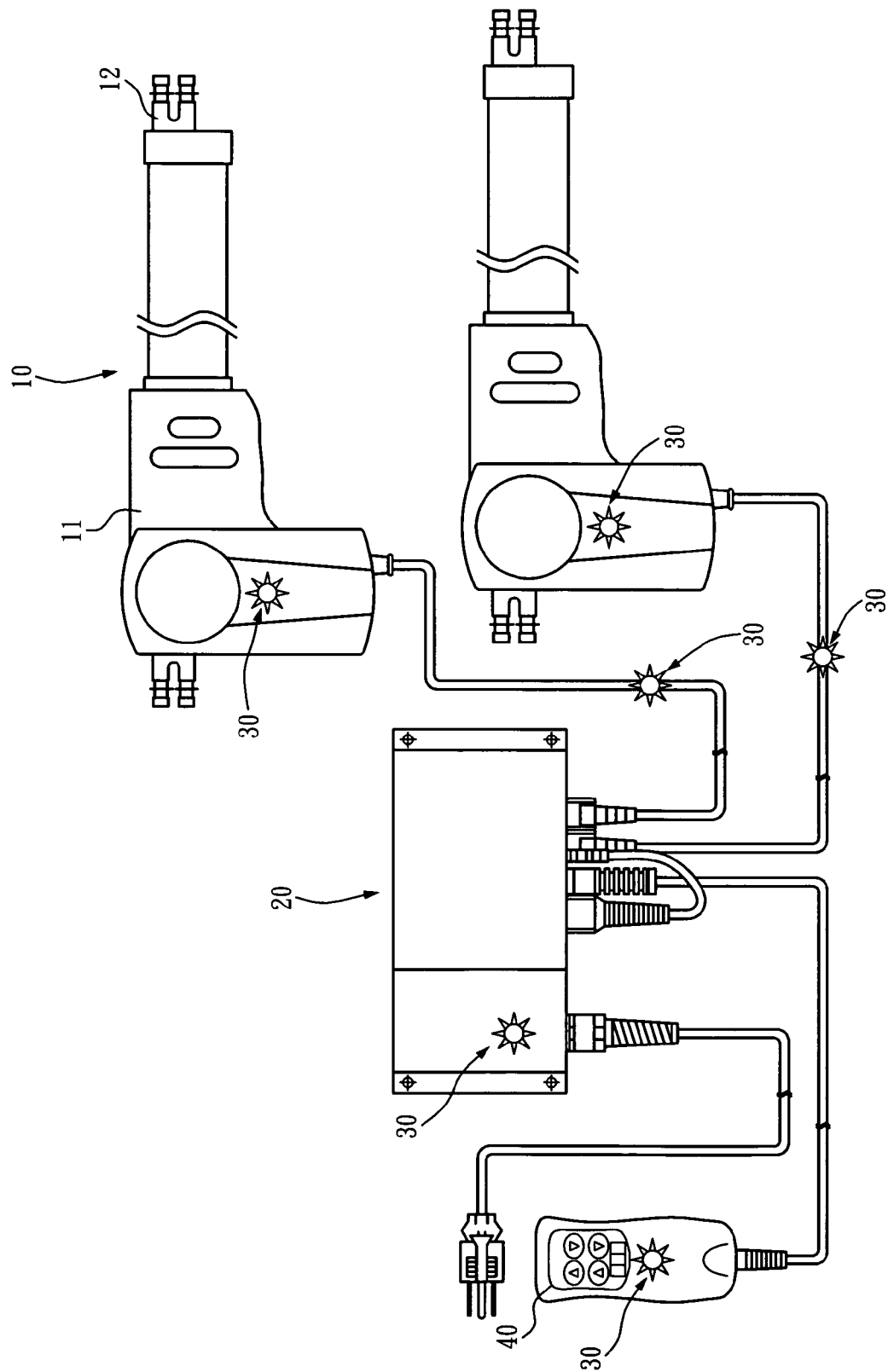
FIG. 1 is a schematic drawing of an actuator assembly according to one embodiment of the present invention.

As shown in FIG. 1, the present invention is an actuator assembly with an operation indication function. The actuator assembly includes an actuator 10, a controller 20 and an indication lamp set 30.

The actuator 10 has a motor 11, a screw (not shown) and an extension rod 12. The motor 11 drives the screw to rotate, so as to extend or retract the extension rod 12. The extension rod 12 has its limit positions connected with a limit switch set 13. Particularly, the limit switch set 13 has a first limit switch 131 and a second limit switch 132 arranged at an extension limit and a retraction limit of the extension rod 12, respectively.

Figure 2:
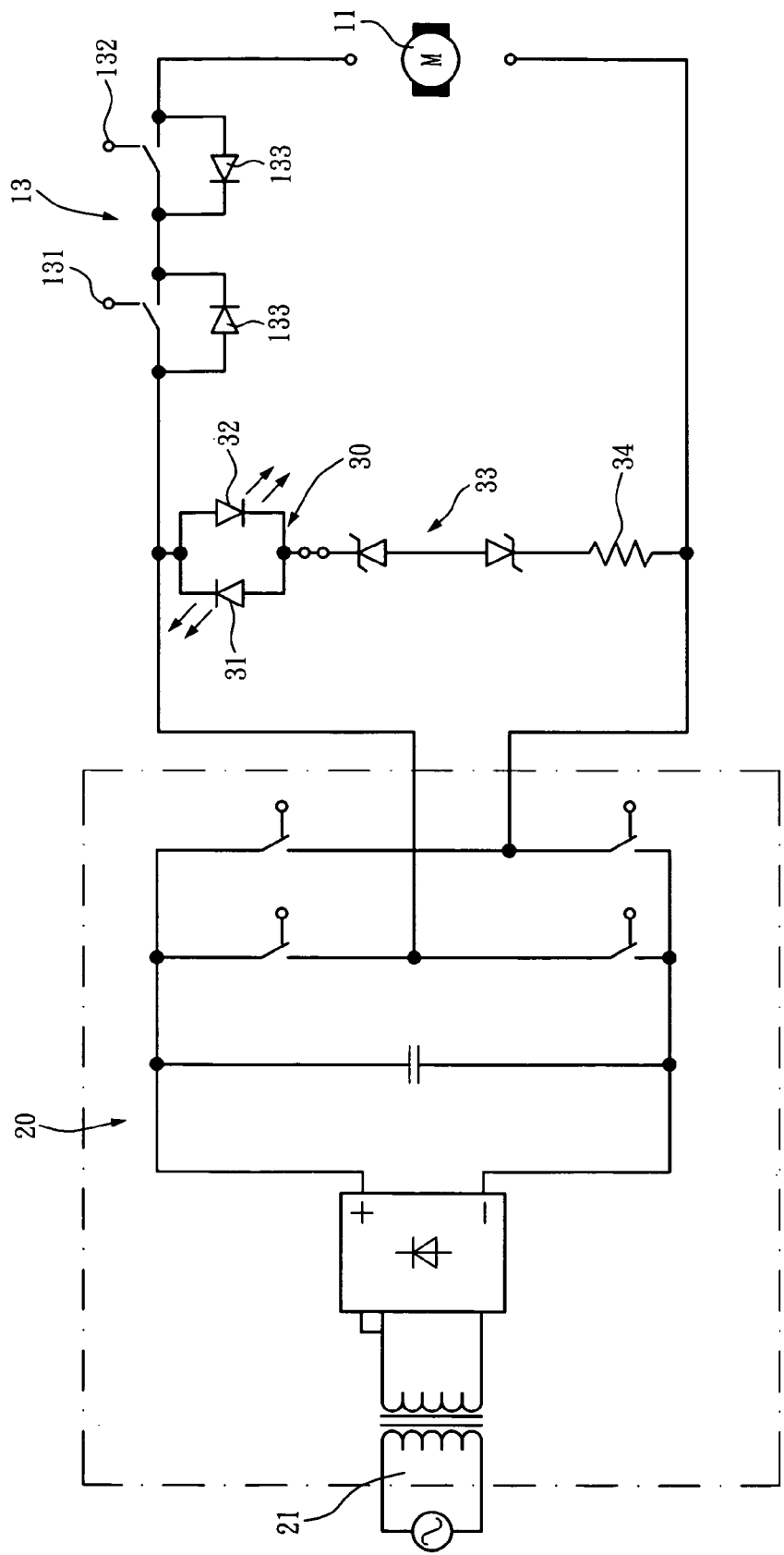
FIG. 2 is a circuit diagram of the present invention.

Referring to FIG. 2, the controller 20 includes a transformer 21 serving to convert an alternating current into a direct current, and control the rotational direction of the motor 11 by revering poles of the motor 11. When the motor 11 rotates clockwise, the extension rod 12 extends. On the contrary, when the motor 11 rotates anticlockwise, the extension rod 12 retracts. The limit switch set 13 enables the actuator 10 to automatically stop when the motor 11 rotates either clockwise or anticlockwise to the extension limit or the retraction limit of the extension rod 12. The first limit switch 131 and the second limit switch 132 are connected in parallel by means of a plurality of diodes 133. However, people skilled in the art would appreciate that the any known structure of actuators may be used in the present invention. In other words, the structural configuration and operational principles of the actuator 10 and the limit switches are known in the art and need not to be described in any length herein.

The indication lamp set 30 is composed of a plurality of Zener diodes 33, a resistor 34, and a first lamp 31 as well as a second lamp 32. The indication lamp set 30 is connected to at least one point on a circuit between the controller 20 and the actuator 10. The first lamp 31 and the second lamp 32 are configured to correspond to the first limit switch 131 and the second limit switch 132.

Figure 3:
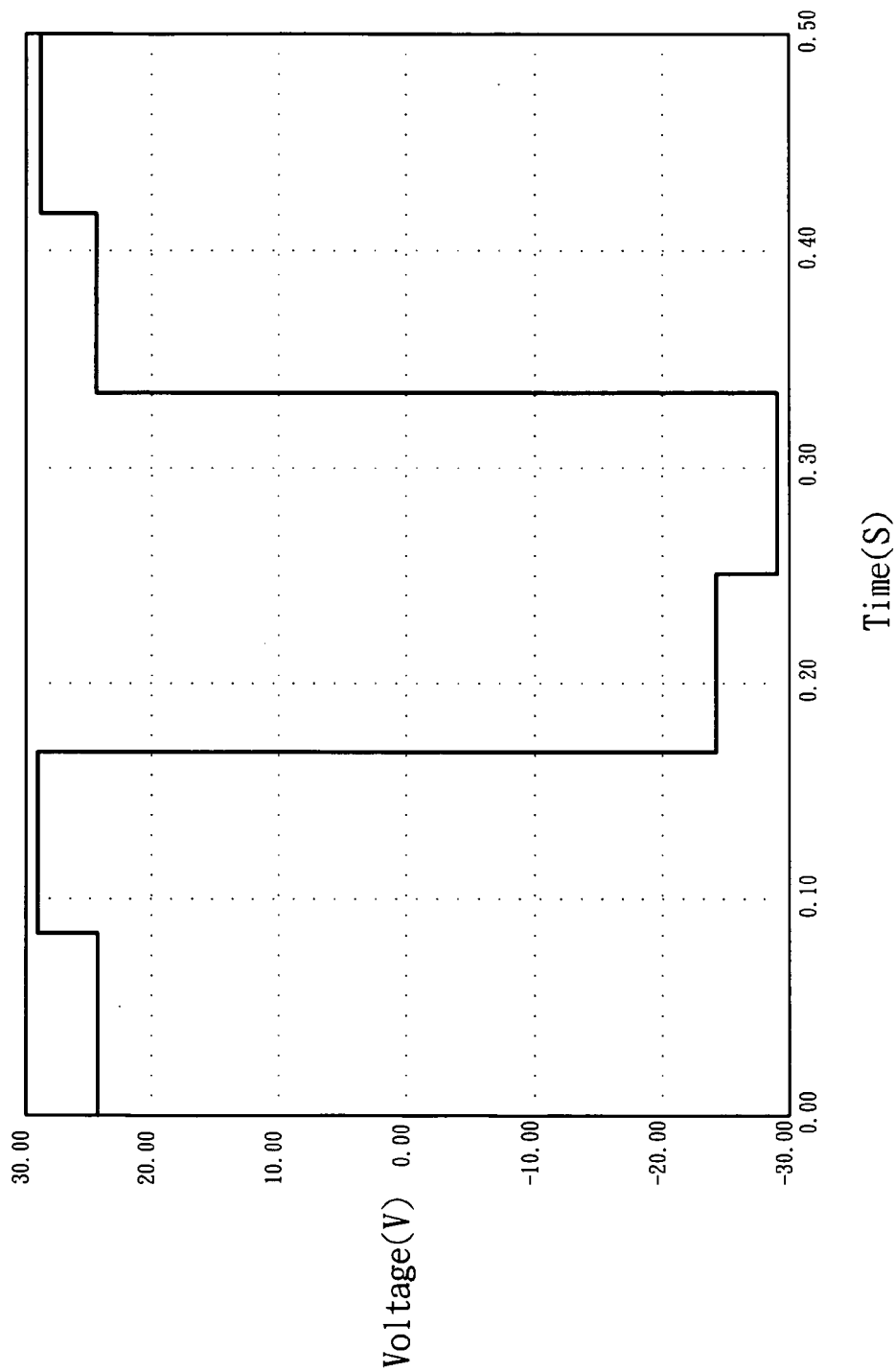
FIG. 3 graphically shows a voltage stress of an indication lamp set according to the present invention.

FIGS. 2 and 3 provides a circuit diagram of the present invention and a graphical diagram of the voltage stress of the indication lamp set. As can be seen in the drawing, the present invention applies the voltage stress, between the controller 20 and the limit switch set 13, to the indication lamp set 30. Thereby, when the controller 20 outputs a voltage to make the motor 11 rotate clockwise and in turn make the extension rod 12 to touch the second limit switch 132, a short circuit happens at the second limit switch 132, and, in response to this, the motor 11 stops operating. At this time, the voltage stress of the indication lamp set 30 raises, as shown in FIG. 3, and the voltage increases from 25 V to 30 V, allowing the current to pass, so that the second lamp 32 illuminates to indicate that the extension rod 12 has triggered the second limit switch 132. On the contrary, when the controller 20 outputs a voltage to make the motor 11 rotate anticlockwise and in turn make the extension rod 12 to touch the first limit switch 131, a short circuit happens at the first limit switch 131, and, in response to this, the motor 11 stops operating. At this time, the voltage stress of the indication lamp set 30 raises, as shown in FIG. 3, and the voltage increases from −25 V to −30 V, allowing the current to pass, so that the first lamp 31 illuminates to indicate that the extension rod 12 has triggered the first limit switch 131.

In the present embodiment of the present invention, as shown in FIG. 1, the controller 20 is electrically communicated with an adjustment device 40. The indication lamp set 30 may be connected in singularity or in plurality to at least one point on the circuit between the controller 20 and the actuator 10, such as on the adjustment device 40, on the controller 20, and on the actuator 10.

Figure 4:
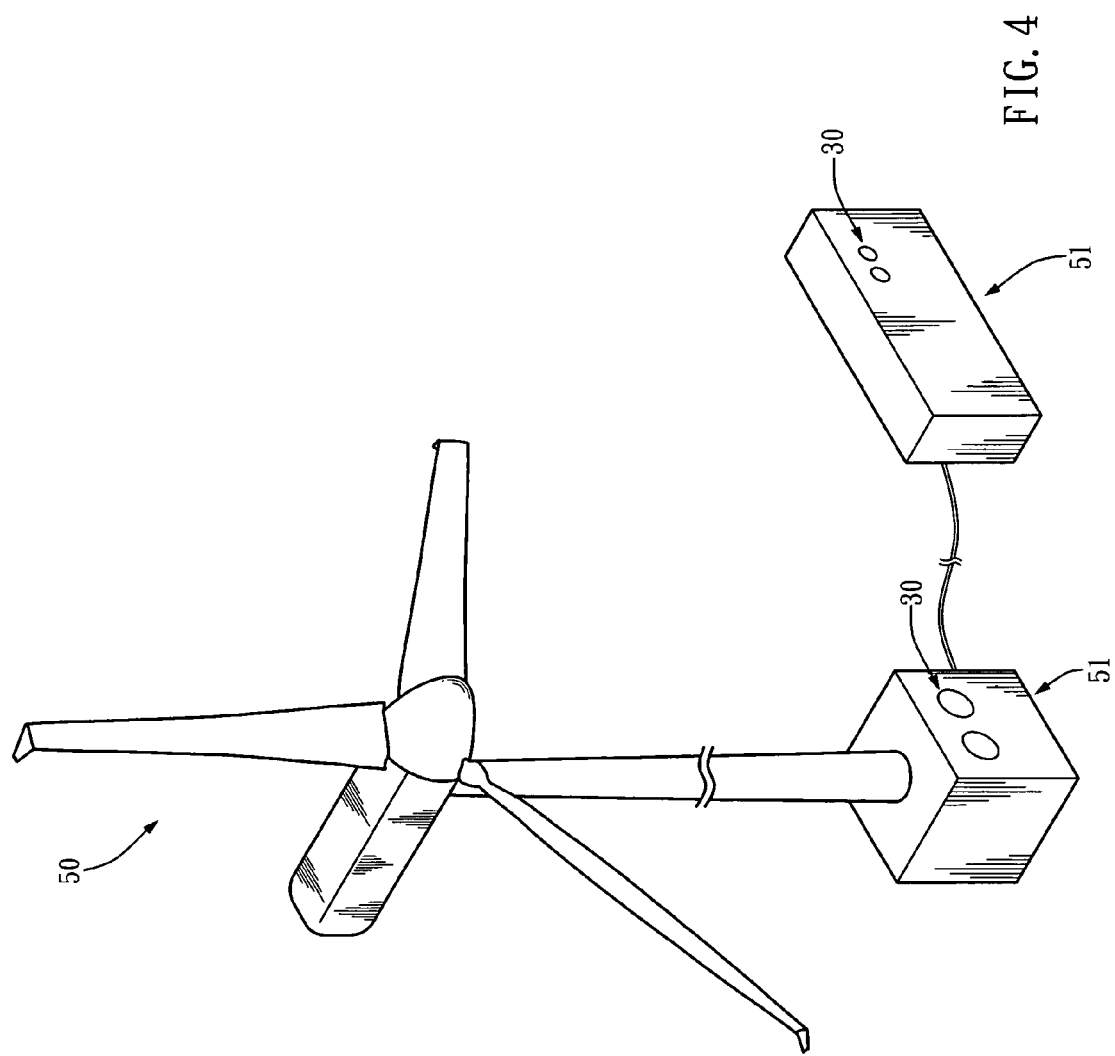
FIG. 4 is an applied view of the actuator assembly of the present invention applied to a wind power generator.

FIG. 4 illustrates the present invention applied to a brake device of a wind power generator 50. The indication lamp set 30 may be arranged on the controller 51. Thereby, an operator can be informed of the fact that the actuator 10 has operated to its limit by the illuminating indication lamp set 30. By using the present invention, even when the actuator 10 is installed inside the wind power generator 50, the operator can easily confirm the completion of braking by direct visual observation.

In virtue of the above structure, the present invention needs no additional signal feedback circuit and thus has the advantages of simple structure, easy installation and low costs.

The present invention has been described with reference to the preferred embodiment and it is understood that the embodiment is not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. An actuator assembly having an operation indication function, the actuator comprising:
    an actuator having a motor, a screw and an extension rod that has limit positions connected with a limit switch set;
    a controller controlling the motor of the actuator to rotate clockwise or anticlockwise; and
    an indication lamp set settled on at least one point on a circuit between the actuator and the controller and electrically communicated with the limit switch set,
    whereby when the extension rod touches any of the limit positions and thus triggers the limit switch set, the indication lamp set illuminates to indicate that the extension rod of the actuator reaches the corresponding limit position.

2. The actuator assembly of claim 1, wherein the limit switch set comprises a first limit switch and a second limit switch.

3. The actuator assembly of claim 2, wherein the indication lamp set comprises a first lamp and a second lamp, which are configured to correspond to the first limit switch and the second limit switch, respectively.

4. The actuator assembly of claim 2, wherein when the motor rotates clockwise and makes the extension rod touch the second limit switch, a voltage stress of the indication lamp set raises to make the second lamp illuminate, while when the motor rotate anticlockwise and makes the extension rod touch the first limit switch, a negative voltage across the indication lamp set raises to make the first lamp illuminate.

5. The actuator assembly of claim 1, wherein the indication lamp set is settled on an adjustment device that is electrically communicated with the controller.

6. The actuator assembly of claim 1, wherein the indication lamp set is settled on the actuator, the controller, and points on the circuit between the actuator and the controller.

* * * * *